United States Patent
Daum

(10) Patent No.: US 10,626,574 B2
(45) Date of Patent: Apr. 21, 2020

(54) DEVICE FOR BUILDING AN UNDERWATER CONSTRUCTION, FILTER APPARATUS FOR A CORRESPONDING DEVICE AND METHOD FOR BUILDING AN UNDERWATER CONSTRUCTION

(71) Applicant: Innogy SE, Essen (DE)

(72) Inventor: Karlheinz Daum, Maxdorf (DE)

(73) Assignee: INNOGY SE, Essen (DE)

( * ) Notice: Subject to any disclaimer, the term of this patent is extended or adjusted under 35 U.S.C. 154(b) by 0 days.

(21) Appl. No.: 16/072,546

(22) PCT Filed: Jan. 23, 2017

(86) PCT No.: PCT/EP2017/051300
§ 371 (c)(1),
(2) Date: Jul. 25, 2018

(87) PCT Pub. No.: WO2017/129514
PCT Pub. Date: Aug. 3, 2017

(65) Prior Publication Data
US 2019/0032297 A1    Jan. 31, 2019

(30) Foreign Application Priority Data
Jan. 25, 2016 (DE) .......................... 10 2016 201 023

(51) Int. Cl.
*E02D 27/52* (2006.01)
*E02D 27/42* (2006.01)
(Continued)

(52) U.S. Cl.
CPC ........... *E02D 27/425* (2013.01); *B01D 15/00* (2013.01); *C02F 1/283* (2013.01); *E02D 5/38* (2013.01);
(Continued)

(58) Field of Classification Search
CPC .. E02D 5/36; E02D 5/40; E02D 27/52; E02B 17/0008
(Continued)

(56) References Cited

U.S. PATENT DOCUMENTS

| 5,226,751 A | 7/1993 | Doleshal |
| 2005/0169711 A1* | 8/2005 | DeAngelis ................ C02F 1/28 405/63 |

(Continued)

FOREIGN PATENT DOCUMENTS

| DE | 102004042390 | 6/2005 |
| DE | 102011122348 | 6/2013 |

(Continued)

OTHER PUBLICATIONS

Indian Patent application No. 1257/MUM/2003, 4 pages, (Jun. 2006).*

(Continued)

*Primary Examiner* — Sunil Singh
(74) *Attorney, Agent, or Firm* — Grossman, Tucker, Perreault & Pfleger, PLLC

(57) ABSTRACT

The invention discloses a method for building an underwater construction comprising a hardened grout, wherein the device has a housing with a receiving volume, and moreover a filter apparatus which is arranged at least partially therein and which is designed to filter out constituents which have been released from the grout. A filter apparatus which can be used in the device, and a method for filling a device for building an underwater construction with a grout, using this filter apparatus, are moreover.

8 Claims, 2 Drawing Sheets

(51) Int. Cl.
*B01D 15/00* (2006.01)
*C02F 1/28* (2006.01)
*E02D 5/38* (2006.01)
*F03D 13/25* (2016.01)
*C02F 103/08* (2006.01)

(52) U.S. Cl.
CPC .......... *E02D 27/52* (2013.01); *C02F 2103/08* (2013.01); *F03D 13/25* (2016.05); *F05B 2230/21* (2013.01)

(58) Field of Classification Search
USPC .............. 405/15–19, 21, 302.4, 302.6, 302.7
See application file for complete search history.

(56) References Cited

U.S. PATENT DOCUMENTS

| | | | |
|---|---|---|---|
| 2008/0199256 A1* | 8/2008 | McPhillips | B09B 3/0025 405/129.57 |
| 2009/0169301 A1* | 7/2009 | Kim | E02B 3/04 405/15 |
| 2012/0103915 A1* | 5/2012 | Das | C02F 1/28 210/724 |
| 2015/0078825 A1* | 3/2015 | Messina | E02B 3/06 405/19 |

FOREIGN PATENT DOCUMENTS

| | | |
|---|---|---|
| JP | 2-96010 A * | 4/1990 |
| WO | 2005/038146 | 4/2005 |
| WO | 2011/010937 | 1/2011 |

OTHER PUBLICATIONS

English translation of International Search Report from corresponding PCT Appln. No. PCT/EP2017/051300, dated Mar. 27, 2017.

* cited by examiner

DEVICE FOR BUILDING AN UNDERWATER CONSTRUCTION, FILTER APPARATUS FOR A CORRESPONDING DEVICE AND METHOD FOR BUILDING AN UNDERWATER CONSTRUCTION

FIELD

The invention relates to a device for building an underwater construction, to a filter apparatus for a corresponding device, and to a method for building an underwater construction.

BACKGROUND

The foundations of offshore constructions are becoming more and more important. This is particularly true for so-called offshore wind turbines which are often grouped together in so-called open-sea wind farms. Such offshore locations offer numerous advantages, for example constant wind conditions and above-average wind speeds.

As a result of these conditions, but also the dead weight acting on the offshore construction, and the flow of water, particular requirements for the underwater construction of the offshore construction are, however, also necessary in order to ensure structural stability. Various foundation options for such offshore constructions are known from the prior art for this purpose. As well as flat foundations, and gravity foundations, monopile foundations (1 pile), tripod or tripile foundations (3 piles in each case), and jacket foundations (4 piles) are in particular known.

In the case of pile foundations, one or more foundation piles are usually driven or wash-drilled into the sea bed. These piles often take the form of hollow steel piles which are placed in the sea bed over a predetermined length. The underwater structure or the anchoring structure of the offshore construction, for example in the form of a jacket foundation, is then placed on these piles.

After this, the cavities which result hereby, in particular annular cavities, are usually filled with a hardening, especially hydraulically setting grout. Cement-based high-performance concrete or high-viscosity polymer concretes are, for example, used as grout which, after they have hardened, transmit forces between the parts of the components which surround each other.

An underwater structure of an offshore construction, and a foundation method are known, for example, from WO 2011/010937 A1.

A disadvantage of the above described foundation of underwater constructions is that, when the grout is poured into the cavities which are arranged under water when the pouring takes place (and hence are initially full of water), the grout can bleed/be washed out, wherein constituents of the grout are released into the surrounding water and leak from the inside of the underwater construction. This leaking is intensified by the grout poured into the cavity displacing the water situated therein. This has the consequence, inter alia, of it being more difficult to monitor the filling process (grouting) because the cement slurry which leaks into the surrounding sea water from the inside of the underwater construction significantly impairs the visibility.

A further disadvantageous consequence of the above described foundation of underwater constructions is that the grout often overflows in an uncontrolled manner, inter alia because it is more difficult to monitor the process and owing to the impaired visibility. Grout hereby leaks, for example, at an upper opening of the filled cavity because it has not been possible to monitor sufficiently the fill level of the grout inside the cavity and therefore an excessively large amount of grout has been pumped into the cavity.

SUMMARY

The object of the present invention is to overcome the above described and other disadvantages. The object of the present invention is in particular to provide a device for building an underwater construction comprising a hardened grout, in which the filling process can be monitored better and there is furthermore no leakage of constituents of the grout.

The object of the present invention is furthermore to make available a method for building an underwater construction using the above described device.

The object of the present invention is furthermore to provide a filter apparatus for filtering out grout constituents which can be released by means of water from a grout suitable for erecting an underwater construction.

More precisely, the present invention relates to a device for building an underwater construction comprising a hardened grout, wherein the device has a housing which has a receiving volume for receiving the grout, and wherein the housing has a filling opening for pouring the grout into the receiving volume and has an outlet opening for the outlet of forced out of the receiving volume. The device is furthermore characterized in that the device has at least one filter apparatus, wherein the filter apparatus is designed to filter out constituents which are released from the grout by means of water situated in the receiving volume, and wherein the filter apparatus is arranged at least partially in the receiving volume.

The underwater construction can be any construction which is suitable for erection below the surface of the water. The underwater construction is preferably arranged below the surface of the water, for example has been vibrated and/or driven into the sea bed. The underwater construction is preferably an underwater structure of an offshore wind turbine. The underwater construction and/or the underwater structure more preferably comprises a foundation pile. The underwater construction more preferably comprises a hardened grout. In other words, the underwater construction to be created is consequently erected by means of or using the grout introduced into the device according to the invention.

The grout is a hardened, in particular a hydraulically setting grout. The grout is likewise preferably a grout which hardens under/in water. The grout is more preferably a cement mortar made from a cement, mixing water, and a silicon-containing aggregate. Portland cement may be mentioned as an example of a suitable grout. Polymer cement is also suitable instead of or in addition to the Portland cement. The as yet unhardened grout is preferably pumped into the device according to the invention by means of a pump.

The device according to the invention for building an underwater construction comprising a hardened grout has a housing which in turn has a receiving volume for receiving the grout. Accordingly, the housing can be any suitable housing that allows the grout to be received. For this purpose, the housing has a filling opening for pouring the grout into the receiving volume. The housing furthermore also has an outlet opening for the outlet of water forced out of the receiving volume and/or grout forced out of the receiving volume.

The device according to the invention is furthermore preferably introduced into subsoil situated below the surface of the water, and this can more preferably take place by vibrating and/or driving the device into the subsoil.

The filling opening can be any opening in the housing which makes it possible for the grout to be poured into the receiving volume which is arranged inside the housing. The filling opening can preferably be used with a conveyor apparatus for conveying the grout. The conveyor apparatus is preferably a pump and more preferably a pump which is connected to the filling opening via a connecting hose. The filling opening within the sense of the invention can also be formed by the discharge opening of a filling tube (a so-called stinger) which is inserted into the receiving space in order to pour in the grout. In particular for the preferred case described below, where the receiving space of the housing is formed by an intermediate space between the outer tube and the inner tube, such a filling tube is often inserted from above into the annular gap thus formed until its discharge opening is arranged at a height as directly as possible above the sea bed.

In the installed position of the housing, the filling opening is preferably arranged in a lower region of the housing. This means that the filling opening is situated closer to the subsoil, in particular the sea bed, in or on which the housing of the device has been positioned than to the surface of the water. The filling opening is preferably arranged in the lower third, more preferably the lower fifth, of the housing between the sea bed and the surface of the water. The filling opening is particularly preferably arranged at the lower end in the installed position of the housing, i.e. as directly as possible above the sea bed.

The outlet opening can be any other opening in the housing which permits the outlet of water forced out of the receiving volume of the housing. After the housing has been positioned in or on the subsoil, the receiving volume of the housing is first filled with water. When the grout is poured into the receiving volume of the housing, for example by means of a pump connected to the filling opening, this water is then displaced by the poured-in grout and escapes from the receiving volume and the housing via the outlet opening. In the event of this contact of the introduced grout with the water situated in the receiving volume, the grout can bleed/be washed out, constituents of the grout being discharged into the water.

In the installed position of the housing, the outlet opening is preferably arranged above the filling opening, more preferably the outlet opening is arranged at a free end of the housing, i.e. at an end of the housing which has not been inserted into the subsoil. As will be explained in more detail below, the outlet opening is an opening of the intermediate space, preferably of the annular gap, which is formed between an inner tube and an outer tube of the housing positioned on the subsoil.

In the installed position of the housing, the outlet opening can, however, be arranged below the filling opening. This is particularly preferred when the outlet opening is a second outlet opening of the housing, i.e. an additional opening in the housing such as, for example, a gap. Such additional openings sometimes occur unwantedly during the forming of the foundation, for example when the seal at the lower end in the installed position fails or is damaged during the pouring in. As will be described below, the present invention also makes it possible to seal such additional openings during the pouring of the grout into the receiving volume of the housing.

In a preferred embodiment, the housing has at least two outlet openings, wherein a first one of these outlet openings is arranged in the installed position of the housing above the filling opening of the housing, and wherein at least a second one of these outlet openings is arranged in the installed position of the housing below the filling opening of the housing.

The device according to the invention moreover has a filter apparatus which is designed to filter out constituents which have been released from the grout from the water situated in the receiving volume. As already described above, when the grout is poured into the receiving volume of the device which is under water and hence filled with water, the grout bleeds/is washed out, wherein constituents of the grout are discharged into the water. The filter apparatus according to the invention then allows these constituents to be filtered out from the water. Any suitable mechanism can effect this filtering out, but preferably adsorption and more preferably physisorption. The filter apparatus can, for example, have a filter medium, preferably rice husk ash, which adsorbs and hence absorbs the washed-out constituents of the grout by physisorption. As a result, the water situated in the receiving volume is purified of the washed-out constituents and can advantageously escape via the outlet opening of the device without the above described disadvantages.

The filter apparatus of the device according to the invention is at least partially arranged in the receiving volume of the device, and it is preferably arranged in the receiving volume.

In a preferred embodiment, the housing has an outer tube and an inner tube, wherein the clear width of the outer tube is greater than the outer diameter of the inner tube. The inner tube is moreover inserted into the outer tube such that the outer tube surrounds the inner tube and the receiving volume of the housing is formed by an intermediate space between the outer tube and the inner tube. Such an intermediate space can also be referred to as an annular gap which preferably has a minimum width of approximately 10 cm and/or an average width of approximately 30-35 cm. The average width results in particular in the case of an unequal width of the annular gap on opposite sides of the housing. The annular gap can thus, for example, have a width of 10 cm at one point of the housing and a width of 60 cm on the side opposite this point.

The filter apparatus is more preferably arranged partially or completely between the filling opening and the outlet opening of the housing. As a result, an effective flow through the filter apparatus of the water escaping from the receiving volume is advantageously enabled, as a result of which the filtering capacity of the filter apparatus is increased. It is thus advantageously ensured that the water is filtered by the filter apparatus before it leaves the housing, and the constituents of the grout which are contained therein are filtered out.

The filter apparatus is preferably arranged so that it can change position in the receiving volume of the housing, particularly preferably above the filling opening. The change of position of the filter apparatus is hereby effected by the grout introduced into the receiving volume. In other words, the filter apparatus is arranged in the receiving volume of the housing such that the change of position is not effected by the water passing through the filter apparatus but by the filter apparatus being displaced by the grout introduced into the receiving space. As a result, the filter apparatus advantageously serves as a fill level indicator or level indicator and allows better checking of the fill level of the grout introduced into the receiving volume. It is consequently possible in particular to reliably prevent grout from overflowing and/or escaping from an outlet opening arranged in the installed position of the housing above the filling opening, preferably at a free end of the housing.

Such an arrangement of the filter apparatus in the receiving volume of the housing can be achieved, for example and preferably, by the filter apparatus being clamped, as described in more detail below, for example in the receiving volume, preferably in an annular gap, or by the filter apparatus being weighed down by a sinker.

The filter apparatus is preferably arranged so that it can change position in the immediate area of the filling opening, in particular above the latter. As a result, the filter apparatus floats on the grout introduced into the receiving volume and is continuously conveyed toward the outlet opening during the process of pouring the grout into the receiving volume. This has the additional advantage that the filter apparatus is, on the one hand, arranged in the region of the highest concentration of the constituents of the grout discharged into the water, and an improved filtering capacity is thus obtained. In order to arrange the filter apparatus in the immediate area of the filling opening, it is preferably weighed down by a sinker in order to prevent the filter apparatus from floating on the water contained in the receiving volume. The sinker is hereby preferably chosen such that the average density of the filter apparatus and the sinker corresponds approximately to that of the water. A preferred example for a sinker is a metal or steel chain, the weight of which can be varied simply by the number of chain links used.

In a particularly preferred embodiment, the filter apparatus is arranged so that it can change position in the immediate vicinity of the outlet opening which is arranged in the installed position of the housing above the filling opening. The phrase "in the immediate vicinity" should hereby be understood to mean that the filter apparatus is at a distance from the outlet opening which corresponds to no more than half, preferably a third, more preferably a quarter, and in particular a fifth of the distance between this outlet opening and the filling opening. Even more preferably, the filter apparatus is here arranged in the housing such that it projects partially from the outlet opening. Such an arrangement has the advantage that, because it is arranged only partially in the receiving volume, the filter apparatus remains visible from outside. Improved checking of the fill level of the grout introduced into the receiving volume is thus made possible.

The visible filter apparatus can in particular be monitored when the grout is introduced into the receiving volume. If said filter apparatus is displaced by the grout owing to the rising level of grout in the receiving volume, by virtue of this movement of the filter apparatus it is possible to detect easily that the filling procedure is complete. The pushing of the filter apparatus completely out of the receiving volume can be detected particularly easily as a signal that the filling procedure is complete. As a result, the filling procedure can advantageously be completed in good time such that grout does not leak from the outlet opening.

The filter apparatus is more preferably arranged in the immediate vicinity of the outlet opening arranged above the filling opening in the installed position of the housing by being clamped into the receiving volume. As a result, on the one hand there is no need to use a sinker (although it is not excluded as a result), and on the other hand the filter apparatus can advantageously be introduced into the device before the device is introduced into the water.

The filter apparatus can preferably be weighed down with a sinker. This is in particular advantageous when it is intended that the filter apparatus is additionally used to close a further outlet opening, for example a gap, which is arranged below the filling opening. The sinker used causes the filter apparatus to sink to the bottom of the housing and there, in the installed position of the housing, closes an outlet opening situated below the filling opening. When the grout is introduced into the receiving volume, water which includes constituents of the grout then passes through the filter apparatus. These constituents of the grout are then filtered through the filter apparatus and accumulate in the filter apparatus. The filter cake which results therefrom advantageously serves as a water barrier, seals the further outlet opening, and also prevents grout from leaking from this outlet opening. More advantageously, the filter apparatus can remain in the device after the filling procedure is complete.

The sinker can be any suitable element by means of which the buoyancy of the filter element in the water is reduced. Accordingly, weights of any type can, for example, be considered. The sinker is particularly preferably a chain, and more preferably a chain made of metal, in particular steel. A chain has the particular advantage that the weight of the sinker can be varied simply by the number of chain links.

The filter element is preferably a filter medium which is enclosed by a filter sleeve. This has the advantage that the filter medium can be in a loose form.

The filter sleeve is moreover preferably configured as a water-permeable filter sleeve, in particular as a tubular packaging. All suitable materials known to a person skilled in the art can be considered as water-permeable filter sleeves, for example a fabric such as in particular jute fabric, for example jute sacking. The water-permeable tubular packaging can more preferably be tube-like packaging with a length of approximately 40-70 cm and a width and/or a diameter of approximately 25-40 cm. This is particularly advantageous when it is intended that the filter elements are introduced into an abovementioned annular gap because the filter elements can then be clamped in place. No further fixing means are then needed.

Any suitable material which ensures that the constituents of the grout are filtered out of the water can be considered as a filter medium. This filtering out takes place in particular by adsorption, more preferably by physisorption. Materials containing lime sand brick quarry, expanded clay, activated charcoal, and/or silica, particularly preferably rice husk ash, can hereby be used as an exemplary and preferred filter material. All of these materials are distinguished by having a high specific surface area.

The filter medium preferably has a structure which is chosen from the group consisting of fibrous structures, powders, and granulates, wherein a fibrous structure is particularly preferred. A granular form (also pellet form or pressed pellet form) is also preferred as good processability is achieved thereby. The material containing silica is preferably an organic material. This means that the material is of a biogenic nature. The organic/biogenic aggregate is particularly preferably a plant-based material. Plant-based materials often advantageously have a fibrous structure. Accordingly, plant-based materials with a fibrous structure are particularly preferably silicon-containing aggregates within the sense of the invention.

The present invention also relates to filter apparatus for filtering out grout constituents which can be released from a grout suitable for constructing an underwater construction, wherein the filter apparatus has at least one water-permeable filter sleeve filled with a filter medium.

The filter apparatus according to the invention, which can be produced simply and is cost-effective, can be used for multiple applications, in particular for filtering water that contains grout constituents. For this purpose, the filter apparatus can preferably be arranged in a filter box through which the water runs, and alternatively or additionally the filter apparatus according to the invention can also be arranged in a water supply or outflow, for example in a return pipe. The filter apparatus according to the invention can particularly advantageously be easily replaced.

The filter apparatus according to the invention has, in a particularly preferred fashion, at least two water-permeable filter sleeves filled with filter medium which are connected to each other by means of a connecting means.

Any suitable type of connection can be envisaged as the connecting means. The connecting means is particularly preferably a cable or a chain. The cable or chain can preferably be made from metal and more preferably from steel. The combination according to the invention of at least two water-permeable filter sleeves filled with a filter medium by means of a connecting means has the advantage that the filter apparatus can, after being pushed out of the receiving volume, be easily recovered and then disposed of. This is particularly advantageous in the case of the use under water according to the invention.

In a very particularly preferred fashion, the filter apparatus according to the invention has more than two water-permeable filter sleeves filled with a filter medium which are connected to each other by means of connecting means to form a ring. Such an embodiment is particularly advantageous when the housing, as described above, comprises an outer tube and an inner tube. The annular filter apparatus can hereby be arranged in the annular gap. A correspondingly designed filter apparatus has the advantage that, in the case of outlet openings of the device according to the invention which have large dimensions and, for example, a round shape (annular gap between the inner tube and the outer tube of the housing), the filter apparatus can be adapted to the geometry (cross-sectional geometry) of the outlet opening such that the filtering capacity is improved. The filter sleeves then more preferably correspond to the above described tubular packaging.

With respect to the preferred embodiments of the filter apparatus and the grout, reference is made to the above description. It should be pointed out that all features can be freely combined with one another as long as there is nothing which obviously opposes such a combination.

The present invention also relates to a method for constructing an underwater construction using the device according to the invention and/or the filter apparatus according to the invention. The method here comprises the steps of positioning a housing of the device on or in an underwater subsoil, and pouring grout into a receiving volume of the housing, wherein the filter apparatus has been introduced before the grout is poured into the receiving volume of the housing.

With respect to the preferred embodiments of the device according to the invention, reference is made to the above descriptions regarding the device according to the invention and the filter apparatus according to the invention. All these features can be freely combined with one another as long as there is nothing which obviously opposes such a combination. Nevertheless, some particularly preferred embodiments will be described in detail below.

Thus, in a particularly preferred embodiment of the method according to the invention, the filter apparatus is introduced into the receiving volume of the housing before the housing of the device is positioned. This advantageously happens in particular at a point in time at which the housing has not yet sunk below the surface of the water. Accordingly, the filter apparatus according to the invention is introduced before the housing of the device has been positioned in or on the underwater subsoil. This has the advantage that no or less underwater work—for example, using divers—is required.

Notwithstanding, the filter apparatus can also be introduced after the housing has been positioned in or on an underwater subsoil. This is particularly advantageous when it is intended to introduce a filter apparatus which is weighed down with a sinker and which sinks onto the bottom in the installed position of the housing.

In a further particularly preferred embodiment of the method according to the invention, at least two filter apparatus are introduced into the receiving volume of the housing before the housing of the device is positioned. A filter apparatus which is weighed down with a sinker is hereby first introduced into the housing such that the filter apparatus sinks, in the installed position of the housing, onto the bottom of the housing after it has sunk below the surface of the water. This filter apparatus introduced first serves to close desired openings—for example, gaps—at the lower end of the housing in the installed position. A further filter apparatus is afterwards introduced into the housing by being clamped inside the receiving volume, wherein this filter apparatus is arranged in the immediate vicinity of the outlet opening arranged above the filling opening in the installed position of the housing. It is not necessary to attach a sinker to this filter apparatus introduced second. This filter apparatus introduced second is furthermore preferably a filter apparatus which consists of water-permeable filter sleeves filled with a filter medium which are connected to one another by means of connecting means to form a ring.

During the pouring of the grout into the receiving volume of the housing, a movement of the filter is particularly preferably detected. This detection preferably takes place via visual monitoring, and more preferably by video monitoring of the filter apparatus. The detection of the movement of the filter apparatus is more preferably the detection of the filter apparatus being pushed out of the receiving volume. The filling procedure is preferably interrupted as soon as such a movement of the filter apparatus is detected.

Moreover, the method according to the invention preferably also comprises the step of recovering and/or disposing of the filter apparatus which is pushed out of the receiving volume by the grout. This is then in particular readily possible if the filter apparatus is a filter apparatus that consists of water-permeable filter sleeves filled with a filter medium which are connected to one another by means of connecting means to form a ring.

As has already been noted many times above, individual features which have been described in connection with an embodiment can also be used separately in other embodiments as long as nothing otherwise has been explicitly described or there is no obvious contradiction.

BRIEF DESCRIPTION OF THE DRAWINGS

Other advantages, details, and features of the invention are apparent from the exemplary embodiments explained in detail below.

DETAILED DESCRIPTION

In the description which now follows, identical reference numbers refer to identical components or identical features such that a description made with respect to one drawing regarding a component is also valid for the other drawings such that there is no need to repeat the description. Individual features which have been described in connection with one embodiment can also be used separately in other embodiments.

Figure 1:
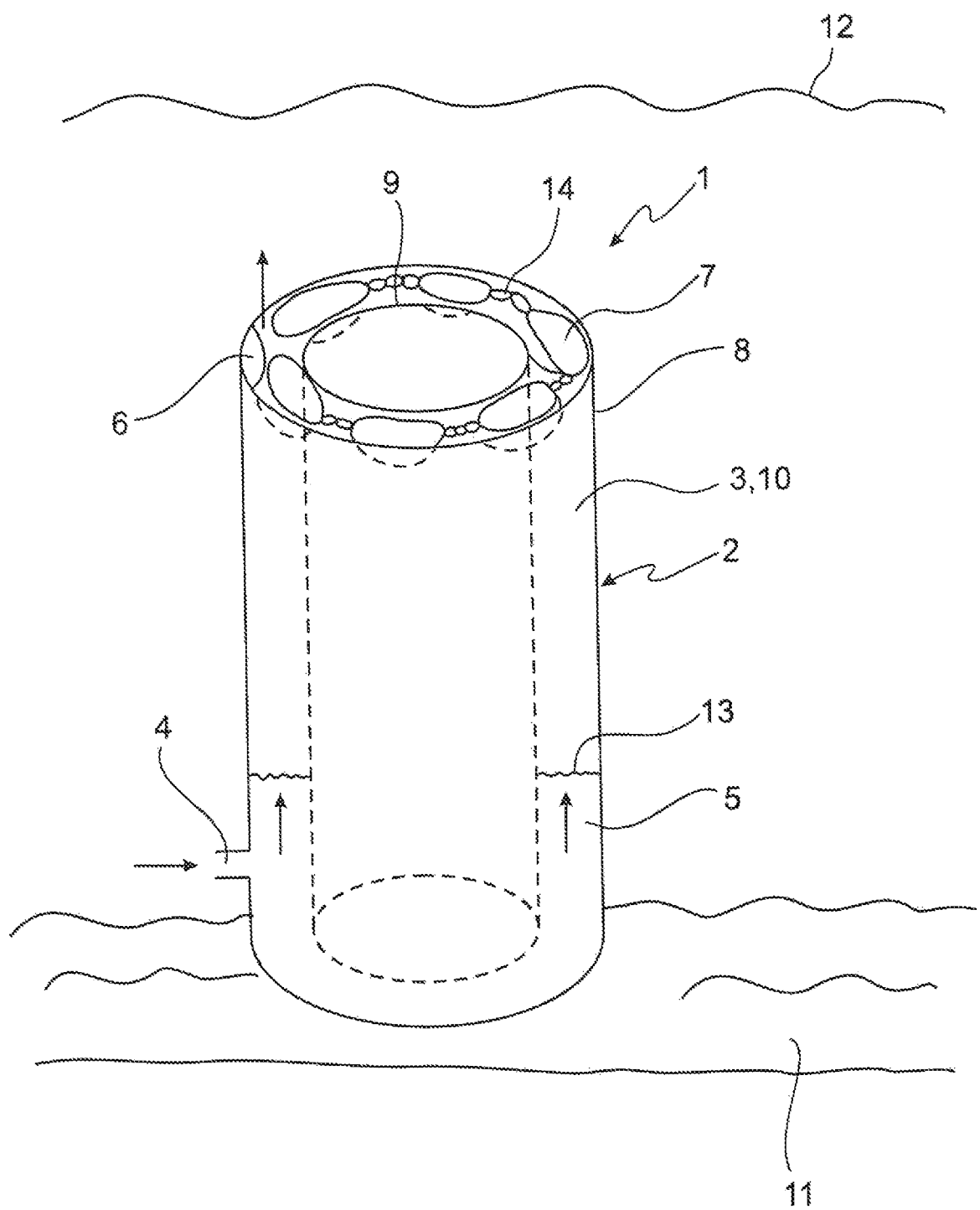
FIG. 1 shows a schematic view of a first embodiment of the device according to the invention with a single outlet opening and using a filter apparatus.

FIG. 1 shows a schematic view of the device 1 according to the invention which has been introduced by vibration into the sea bed as an underwater subsoil 11 as part of a foundation pile for an offshore construction. The device 1 according to the invention is therefore arranged below the surface of the water 12.

The device 1 has a housing 2 which in turn has an outer tube 8 and an inner tube 9. Both tubes are hereby manufactured from steel plate. The diameter or the first clear width of the outer tube 8 is furthermore greater than the diameter or the second clear width of the inner tube 9. As can be seen with the aid of FIG. 1, the inner tube 9 is inserted into the outer tube 8 such that it is surrounded by the latter. In other words, an annular gap is formed between the outer tube 8 and the inner tube 9. This annular gap has a width of approximately 30-35 CM.

The intermediate space/annular gap 10 formed between the outer tube 8 and the inner tube 9 represents the receiving volume 3 of the housing 2.

As can moreover be seen, the device has a filling opening 4 which pierces the outer tube 8 and hence provides access to the receiving volume 3. The filling opening 4 is configured so as to be connected to a connecting hose which leads to a pump which serves as a conveying means for the grout 5 to be introduced into the receiving volume. The pump and the hose are not shown in FIG. 1.

As can moreover be seen in FIG. 1, already introduced grout 5, which is a cement mortar, is situated inside the receiving volume 3. The grout 5 is moved by the conveying means in the direction of flow indicated by means of arrows. The fill level 13 of the grout 5 in the receiving volume 3 hereby rises and thus displaces the water initially situated in the receiving volume 3.

The device shown moreover has an outlet opening 6 through which the water displaced by the grout 5 can escape. As can be seen, the outlet opening 6 is arranged above the filling opening 4 in the installed position of the housing 2. The outlet opening 6 is more precisely arranged at the upper and free end of the housing 2 which has not been vibrated into the sea bed 11. The outlet opening 6 can also be viewed as an opening of the annular gap 10 between the outer tube 8 and the inner tube 9.

The filter apparatus 7 is also arranged at the upper end of the housing 2. Before the housing 2 has sunk onto the sea bed 11, the filter apparatus 7 was clamped inside the annular gap 10 in such a way that the filter apparatus 7 is partially arranged in the receiving volume 3. In other words, part of the filter apparatus 7 protrudes through the outlet opening 6 of the housing 2. This has the advantage that the filter apparatus 7 can be visually checked very easily because it can be easily seen.

The filter apparatus 7 moreover consists of a plurality of tubular and water-permeable filter sleeves, filled with filter medium, which are connected at their respective ends via connecting means 14 to form a ring. The filter apparatus connecting means 14 are hereby preferably steel cables or chains.

The filter medium which is situated in the filter apparatus 7 is moreover rice husk ash pressed into pellets.

Figure 2:
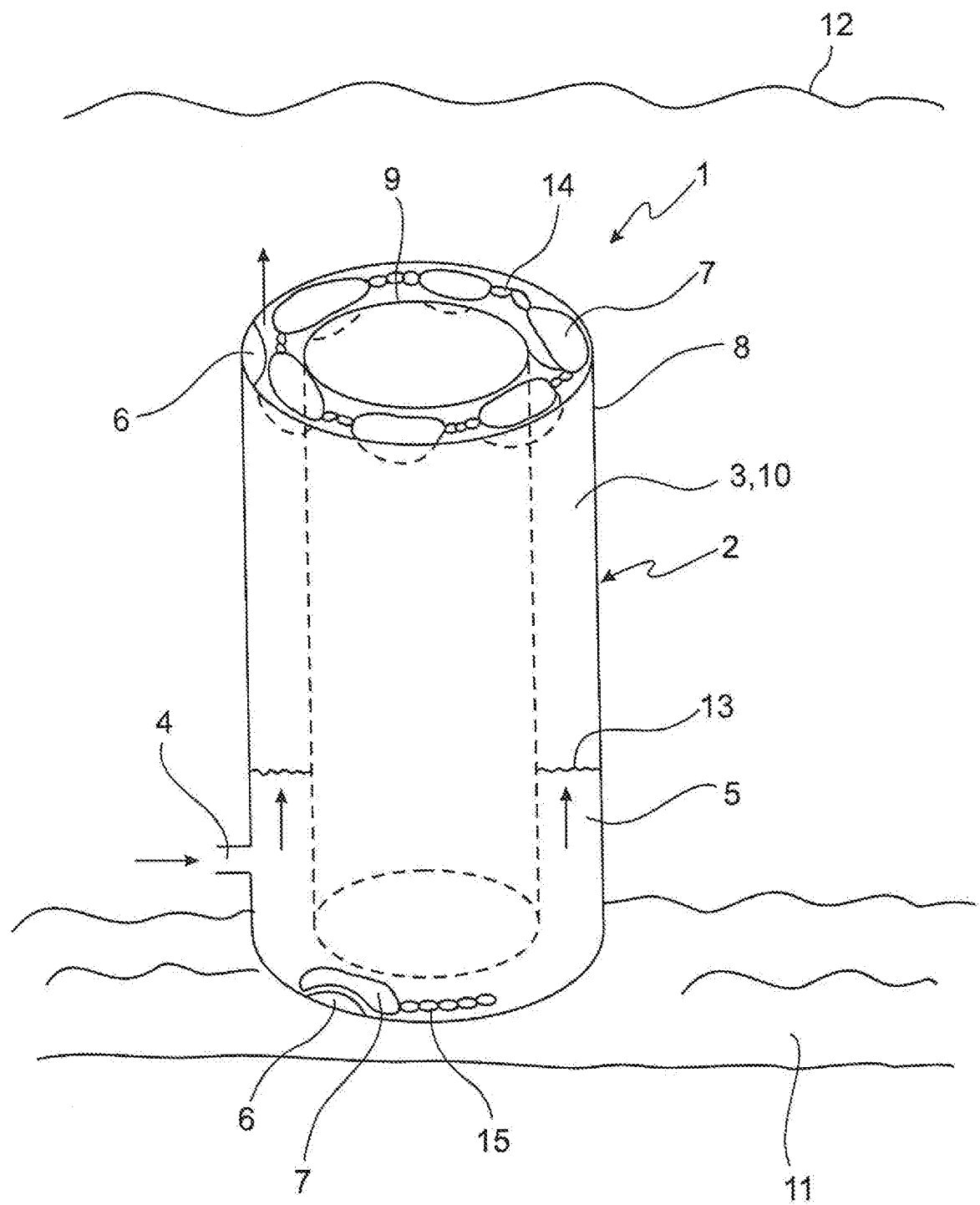
FIG. 2 shows a schematic view of a further embodiment of the device according to the invention with two outlet openings and using two filter apparatus.

FIG. 2 shows a schematic view of a further embodiment of the device according to the invention, wherein most features substantially correspond to the embodiment in FIG. 1.

A schematic view of the device according to the invention is again shown which has been positioned on the sea bed as an underwater subsoil 11 as part of a foundation pile for an offshore construction and is hence arranged below the surface of the water 12.

The device 1 also shows a housing 2 consisting of an outer tube 8 and an inner tube 9 inserted therein, wherein both tubes are again manufactured from steel plate.

A filter apparatus 7 has again been clamped at the upper end of the housing 2 in the intermediate space/annular gap 10 formed between the outer tube 8 and the inner tube 9. The filter apparatus 7 of the embodiment in FIG. 2 also consists of a plurality of tubular and water-permeable filter sleeves, filled with rice husk ash in pellet form and made from a fabric, which are connected to one another at their respective ends via connecting means 14 to form a ring.

The device 1 shown in FIG. 2 moreover has an outlet opening 6 which is arranged above the filling opening 4 at the upper and free end of the housing 2 which has not been positioned on the underwater subsoil 11.

In addition to this first outlet opening 6, the device 1 according to the embodiment in FIG. 2 has a further outlet opening 6, wherein this outlet opening 6 is formed by a gap at the lower end, in the installed position, of the housing 2.

Before the pouring of grout 5 into the receiving volume 3 begins, a filter apparatus 7 weighed down with a steel chain as a sinker 15 was introduced into the receiving volume 3 in order to close this gap 6. The filter apparatus 7 weighed down in this way sank onto the bottom of the housing 2 and came to lie in front of the gap 6.

After this, the pouring of grout 5 into the receiving volume 3 was begun and a filter cake is formed in the filter apparatus 7 weighed down by the sinker 15 by the constituents of the grout 5 which are absorbed by the filter medium. As a result, the gap 6 in the housing 2 was effectively sealed.

As can moreover be seen in FIG. 2 with the aid of the fill level 13, as a result of this effective sealing of the gap 6, a column of grout could subsequently be established in the receiving volume 3.

In both of the embodiments described above in detail, the water which escapes from the outlet opening or openings 6 and is displaced by the integrated grout 5 was effectively purified by the filter apparatus 7 such that essentially no constituents released from the grout 5 pass out of the device 1. As a result, an effective visual check of the procedure for pouring the grout 5 into the housing 2 has been ensured and moreover contamination of the environment by constituents of the grout 5 prevented.

LIST OF REFERENCE NUMERALS 1 device
2 housing
3 receiving volume
4 filling opening
5 grout; cement mortar
6 outlet opening
7 filter apparatus; tubular and water-permeable filter sleeve filled with filter medium
8 outer tube
9 inner tube
10 intermediate space; annular gap
11 subsoil; underwater subsoil; sea bed 12 surface of the water
13 fill level of the grout
14 connecting means; cable; steel chain
15 sinker; steel chain

What is claimed is:

1. A device for building an underwater construction with a grout, the device comprising:
   a housing which has a receiving volume for receiving the grout, the housing having
      a filling opening for pouring the grout into the receiving volume;
      an outlet opening for an outlet of water forced out of the receiving volume; and
      an outer tube and an inner tube;
   wherein
      a clear width of the outer tube is greater than an outer diameter of the inner tube; and
      the inner tube is inserted into the outer tube such that the outer tube surrounds the inner tube and the receiving volume of the housing is formed by an intermediate space between the outer tube and the inner tube;
   wherein
      the device has at least one filter apparatus;
      the filter apparatus is designed to filter out constituents which are released from the grout by water situated in the receiving volume; and
      the filter apparatus is arranged at least partially in the receiving volume.

2. The device as claimed in claim 1, wherein the filter apparatus is arranged between the filling opening and the outlet opening of the housing.

3. The device as claimed in claim 1, wherein the filter apparatus is arranged to have a changeable position in the receiving volume of the housing.

4. The device as claimed in claim 1, wherein the filter apparatus is arranged in an immediate vicinity of the outlet opening arranged above the filling opening in an installed position of the housing.

5. The device as claimed in claim 1, wherein the filter apparatus is weighed down by a sinker.

6. The device as claimed in claim 1, wherein the filter apparatus comprises at least one water-permeable filter sleeve filled with a filter medium.

7. A method for filling a device for building an underwater construction with a grout, the method comprising:
   attaining the device for building the underwater construction with the grout, the device comprising a housing which has a receiving volume for receiving the grout, the housing having
      a filling opening for pouring the grout into the receiving volume;
      an outlet opening for an outlet of water forced out of the receiving volume; and
      an outer tube and an inner tube;
   wherein
      a clear width of the outer tube is greater than an outer diameter of the inner tube; and
      the inner tube is inserted into the outer tube such that the outer tube surrounds the inner tube and the receiving volume of the housing is formed by an intermediate space between the outer tube and the inner tube;
   wherein
      the device has at least one filter apparatus;
      the filter apparatus is designed to filter out constituents which are released from the grout by water situated in the receiving volume;
      the filter apparatus is arranged at least partially in the receiving volume;
   positioning the housing of the device in or on an underwater subsoil; and
   pouring the grout into the receiving volume of the housing, wherein the filter apparatus has been introduced before the grout is poured into the receiving volume of the housing.

8. The method as claimed in claim 7, further comprising recovering the filter apparatus when pushed out of the receiving volume by the grout.

* * * * *